(12) United States Patent
Maity et al.

(10) Patent No.: US 9,256,271 B2
(45) Date of Patent: Feb. 9, 2016

(54) PREDICTIVE POWER MANAGEMENT BASED ON USER CATEGORY

(71) Applicant: AMERICAN MEGATRENDS, INC., Norcross, GA (US)

(72) Inventors: Sanjoy Maity, Snellville, GA (US); Santhosh Samuel Mathews, Chennai (IN); Lokeshraj Subramanian, Chennai (IN)

(73) Assignee: AMERICAN MEGATRENDS, INC., Nocross, GA (US)

( * ) Notice: Subject to any disclaimer, the term of this patent is extended or adjusted under 35 U.S.C. 154(b) by 334 days.

(21) Appl. No.: 14/046,433

(22) Filed: Oct. 4, 2013

(65) Prior Publication Data

US 2015/0100801 A1  Apr. 9, 2015

(51) Int. Cl.
*G06F 1/32* (2006.01)

(52) U.S. Cl.
CPC .............. *G06F 1/3206* (2013.01); *G06F 1/324* (2013.01); *G06F 1/3296* (2013.01)

(58) Field of Classification Search
CPC ...... G06F 1/3206; G06F 1/324; G06F 1/3296
See application file for complete search history.

(56) References Cited

U.S. PATENT DOCUMENTS

| | | | |
|---|---|---|---|
| 2003/0009705 A1* | 1/2003 | Thelander | G06F 1/3203 713/340 |
| 2011/0145607 A1* | 6/2011 | Watakabe | G06F 1/3203 713/310 |
| 2011/0314320 A1* | 12/2011 | Chang | F24D 19/1048 713/340 |
| 2012/0323385 A1* | 12/2012 | Thiruvengada | G06F 1/3203 700/291 |

* cited by examiner

*Primary Examiner* — Stefan Stoynov
(74) *Attorney, Agent, or Firm* — Locke Lord LLP; Tim Tingkang Xia, Esq.

(57) ABSTRACT

The present disclosure relates to a predicative power management system configured to adjust computer CPU clock rate by a computer user to conserve energy based on user category. In certain embodiments, the predicative power management system includes (a) a computer user profile creator module, and (b) a power management module. The computer user profile creator module is used to create computer usage profiles and each of the computer usage profiles has a profileID for a computer user with a computer userID. The power management module is used to set and adjust computer CPU clock rate, CPU voltage and device states based on computer users' category and the computer user's computer usage profile.

20 Claims, 4 Drawing Sheets

USER AND DEFAULT PROFILE TABLE

| USER | DEFAULT PROFILE | PROFILE DESCRIPTION |
|---|---|---|
| USER-1 | PROFILE-4 | ADMINSTRATION ASSISTANTS |
| USER-2 | PROFILE-1 | SYSTEM ENGINEER, VERIFICATION |
| ...... | ...... | ...... |
| USER-N | PROFILE-4 | TECHNICAL WRITER |

FIG. 3A

PROFILE TABLE (CORE 2 EXTREME X6800)

| PROFILE ID | WORK STATES | CLOCK RATIO | CPU CLOCK RATE | CPU VOLTAGE | CPU LOAD |
|---|---|---|---|---|---|
| PROFILE-0 | G0, D0, C0, P0 | 11X | 2.93GHZ | 1.2875V | 81-100% |
| PROFILE-1 | G0, D0, C0, P1 | 10X | 2.67GHZ | 1.2500V | 71-80% |
| PROFILE-2 | G0, D0, C0, P2 | 9X | 2.40GHZ | 1.2250V | 51-70% |
| PROFILE-3 | G0, D0, C0, P3 | 8X | 2.13GHZ | 1.2125V | 31-50% |
| PROFILE-4 | G0, D0, C0, P4 | 7X | 1.87GHZ | 1.2000V | 11-30% |
| PROFILE-5 | G0, D0, C0, P5 | 6X | 1.60GHZ | 1.1750V | 0-10% |

PREDICTIVE POWER MANAGEMENT BASED ON USER CATEGORY

FIELD

The present disclosure generally relates to computer power management, and more particularly to a method to predicatively manage power consumption on a computer based on user category.

BACKGROUND

Modern technology makes the central processing unit (CPU) in a personal computer faster. Typically, the faster the speed of the CPU is, the higher the energy consumption will be. Although we can use different methods to reduce the energy consumption of our computers such as: hibernating the computer, turning off the display controller, turning off the wireless or Wi-Fi adapter, turning off or reducing the speed of the hard drives, and turning off multimedia accessories, but such activities may hamper the computer's functionalities and hinder users' ability to perform their duties. Everyone in an office may have different functions and they use computers in many different ways. Therefore, it is desirable to have a computer system that can reduce the power consumption by turning off those unnecessary components of the computer while maintaining a fully functional computer for each user based on their daily functions and computer usage patterns.

Therefore, heretofore unaddressed needs still exist in the art to address the aforementioned deficiencies and inadequacies.

SUMMARY

In one aspect, the present disclosure relates to a predicative computer power management method based on user category. In one embodiment, the method includes one or more of following operations: (a) creating computer usage profiles for computer users, based on their daily computer usages in a computer, with each of computer users having a unique userID, and each of the computer usage profiles having a unique profileID, (b) storing the computer usage profiles and the computer userIDs in a power management module, (c) associating each of the computer users with at least one computer usage profile; and (d) adjusting the CPU clock rate, CPU voltage, and device states to conserve energy based on a computer user and its associated computer usage profile when the computer user logs into the computer. In certain embodiments, the creating computer usage profiles operation may include one or more of the following operations: (a) monitoring the CPU usage by a computer user profile creator module for each of the computer users over a predetermined time to obtain history of the daily usages of computer resource by the computer users, (b) analyzing the obtained history of the daily usages of the computer resource by the computer users, (c) determining the maximum, minimum, and average daily usage of computer resource by the computer users, and (d) setting optimal CPU clock rate, CPU voltage and device states needed by the each of the computer users in a computer usage profile associated with a computer user such that the computer user's daily function will not be affected by using the optimal CPU clock rate, CPU voltage and device states to achieve maximum energy saving.

In certain embodiments, the computer user profile creator module has access to the CPU to monitor the CPU usage statistics. The computer users are categorized into certain user categories. The computer users belonging to each user category perform similar functions, and have similar demands for the computer resources and similar computer usage patterns.

The adjusting the CPU clock rate operation may include one or more of following operations. In one embodiment, the adjusting the CPU clock rate operation may include one or more of following operations (a) setting the CPU clock rate at the computer user login based on a default CPU clock rate set by the default computer usage profile, (b) setting the CPU voltage at the computer user login based on a default CPU voltage set by the default computer usage profile, (c) setting the device states for the devices at the computer user login based on a default device states set by the default computer usage profile. In another embodiment, the adjusting the CPU clock rate operation may include one or more of following operations (a) setting the CPU clock rate according to the default CPU clock rate set by a computer usage profile selected by the computer user that is different from the default computer usage profile, (b) setting the CPU voltage according to the default CPU voltage set by a computer usage profile selected by the computer user that is different from the default computer usage profile, (c) setting the device states for the devices according to the default device states set by a computer usage profile selected by the computer user that is different from the default computer usage profile. In yet another embodiment, the adjusting the CPU clock rate operation may include one or more of following operations (a) changing the CPU clock rate manually by the computer user pressing certain hotkey combinations to increase or decrease the CPU clock rate of the computer by a discrete step up or down, (b) changing the CPU voltage manually by the computer user pressing certain hotkey combinations to increase or decrease the CPU voltage of the computer by a discrete step up or down, and (c) changing the device states manually by the computer user.

In one embodiment, the setting the CPU clock rate operation may include displaying the current CPU clock rate on a screen for the computer user. In another embodiment, the setting CPU voltage operation may include displaying the current CPU voltage on a screen for the computer user. In yet another embodiment, the setting device states operation may include displaying the current device states on a screen for the computer user. In certain embodiments, the pressing certain hotkeys operation may include one or more of following: (a) pressing <ctrl>+<alt>+<+> combination simultaneously for increasing the CPU clock rate by a discrete step up, (b) pressing <ctrl>+<alt>+<−> combination simultaneously for decreasing the CPU clock rate by a discrete step down, (c) pressing <ctrl>+<alt>+<↑> combination simultaneously for increasing the CPU voltage by a discrete step up, and (d) pressing <ctrl>+<alt>+<↓> combination simultaneously for decreasing the CPU voltage by a discrete step down.

One discrete CPU clock rate step is the CPU clock rate difference between a first allowable CPU clock rate and the next higher allowable CPU clock rate, and each of allowable CPU clock rates is a CPU clock rate between a minimum allowable CPU clock rate and a maximum allowable CPU clock rate. One discrete CPU voltage step is the CPU voltage difference between a first allowable CPU voltage and the next higher allowable CPU voltage, and each of allowable CPU voltages is a CPU voltage between a minimum allowable CPU voltage and a maximum allowable CPU voltage.

In another aspect, the present disclosure relates to a predicative power management system configured to adjust computer CPU clock rate by a computer user to conserve energy based on user category. In certain embodiments, the predicative power management system includes (a) a computer user profile creator module, and (b) a power management module. The computer user profile creator module is used to create computer usage profiles and each of the computer usage profiles have a profileID for a computer user with a computer userID. The power management module is used to set and adjust computer CPU clock rate, CPU voltage and device states based on computer users' category and the computer user's computer usage profile.

In certain embodiments, the computer user profile creator module performs one or more of following operations: (a) monitoring the CPU usage by the computer user profile creator module for each of the computer users over a predetermined time to obtain the history of the daily usages of computer resource by the computer users, (b) analyzing the obtained history of the daily usages of the computer resource by the computer users, (c) determining the maximum, minimum, and average daily usage of the computer resource by the computer users, and (d) set optimal CPU clock rate, CPU voltage and device states needed by the each of the computer users in a computer usage profile associated with a computer user such that the computer user's daily function will not be affected by using the optimal CPU clock rate, CPU voltage and device states to achieve maximum energy saving.

In one embodiment, the computer user profile creator module can import the computer usage profiles previously obtained from other computer systems. In another embodiment, the computer user profile creator module can edit or modify existing computer usage profiles. In yet another embodiment, the computer user profile creator module can assign a computer usage profile to a computer user.

In certain embodiments, the power management module performs one or more of following operations: (a) receiving computer usage profiles for the computer users from the computer user profile creator module, (b) storing the computer users and computer usage profiles in a user and default computer usage profile table, (c) associating each of the computer users with one default computer usage profile for the computer user, (d) setting the computer CPU clock rate, CPU voltage, and device states according to the default computer usage profile upon the computer user logs into the computer system, and (e) allowing the computer user press certain hotkeys to adjust the CPU clock rate, CPU voltage, and device states when necessary.

In certain embodiments, the power management module is can also perform one or more of following operations: (a) allowing a computer user to select a computer usage profile other than a default computer usage profile associated with the computer user, (b) displaying the current CPU clock rate, (c) displaying the current CPU voltage, (d) displaying the current device states, and (e) displaying the current computer usage profile settings.

In certain embodiments, the pressing certain hotkeys combination operation includes one or more of following: (a) pressing <ctrl>+<alt>+<+> combination simultaneously for increasing the CPU clock rate by a discrete step up, (b) pressing <ctrl>+<alt>+<−> combination simultaneously for decreasing the CPU clock rate by a discrete step down, (c) pressing <ctrl>+<alt>+<↑> combination simultaneously for increasing the CPU voltage by a discrete step up, and (d) pressing <ctrl>+<alt>+<↓> combination simultaneously for decreasing the CPU voltage by a discrete step down.

In another aspect, the present disclosure relates to a non-transitory computer storage medium. The non-transitory computer storage medium stores computer-executable instructions. When these computer-executable instructions are executed by a processor of a predicative computer power management system, the computer-executable instructions cause the processor to perform one or more of following operations: (a) creating computer usage profiles for computer users, based on their daily computer usages in a computer, with each of computer users having a unique userID, and each of the computer usage profiles having a unique profileID, (b) storing the computer usage profiles and the computer userIDs in a power management module, (c) associating each of the computer users with at least one computer usage profile; and (d) adjusting the CPU clock rate, CPU voltage, and device states to conserve energy based on a computer user and its associated computer usage profile when the computer user logs into the computer.

In certain embodiments, the non-transitory computer storage medium may include computer-executable instructions to perform one or more of following operations: (a) monitoring CPU usage by the computer user profile creator module for each of the computer users over a predetermined time to obtain the history of the daily usages of computer resource by the computer users, (b) analyzing the obtained history of the daily usages of the computer resource by the computer users, (c) determining the maximum, minimum, and average daily usage of the computer resource by the computer users, and (d) setting optimal CPU clock rate, CPU voltage and device states needed by the each of the computer users in a computer usage profile associated with a computer user such that the computer user's daily function will not be affected by using the optimal CPU clock rate, CPU voltage and device states to achieve maximum energy saving. The computer users are categorized into certain user categories. The computer users in each user category perform similar functions, and have similar demands for the computer resources and similar computer usage patterns.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

A CPU is the computing and control hardware element of a computer-based system. In a personal computer, for example, the CPU is usually an integrated part of a single, extremely powerful microprocessor. An operating system is the software responsible for allocating system resources including memory, processor time, disk space, and peripheral devices such as printers, peripherals, and monitors. All applications use the operating system to gain access to the resources needed. The operating system is the first program loaded into the computer as it boots up, and it remains in memory throughout the computing session.

Advanced CPUs are achieving higher performance as time goes on but, at the same time, are consuming more power and generating more heat making systems the use the CPUs more difficult to be implemented, especially in mobile form factors such as notebook computers, hand-held PDAs, or tablet PCs. Even for desktop PC implementation, the heat generated by the advanced CPUs mandates an active cooling mechanism, such as a fan sink, creating undesirable acoustic noise.

Previously, CPU power management has been implemented using an external power management controller (PMC) to monitor system activities at known legacy I/O or memory addresses to determine power management policy for an individual device. If all relevant system resources are powered down, then the PMC may then put the CPU into a lower power state.

For the Microsoft Windows operating system environment, some software schemes use a so-called "CPU Cooler Program" to execute a halt instruction, or a "Ring 0 Program" to put the CPU into a lower power state when the operating system or applications are idle. The program takes advantage of the fact that the operating system will execute the "idle loop software module" when Windows is not busy. The approach is only effective, however, if all tasks are idle and reported to Windows as such.

Intel, Toshiba, and Microsoft published the ACPI (Advanced Configuration Power Interface) power management specification that is intended to provide a standardized, operating system-independent and platform-independent power management mechanism to enable the OSPM (operating system-directed power management) initiative. An ACPI-compatible operating system may balance CPU performance versus power consumption and thermal states by manipulating the processor performance controls, and the ACPI-compatible operating system provides tools for computer users to manipulate the CPU control mechanism directly through the operating system.

OSPM is very effective for peripheral device power management, such as for UARTs or wireless adaptors, since OSPM knows whether the port is opened or the modem is in use. However, OSPM is not effective with CPU power management since OSPM does not know nor can it predict the CPU workload. Therefore, OSPM is not able to set the CPU to the appropriate power state to execute user tasks without performance degradation while minimizing power consumption.

Figure 1:
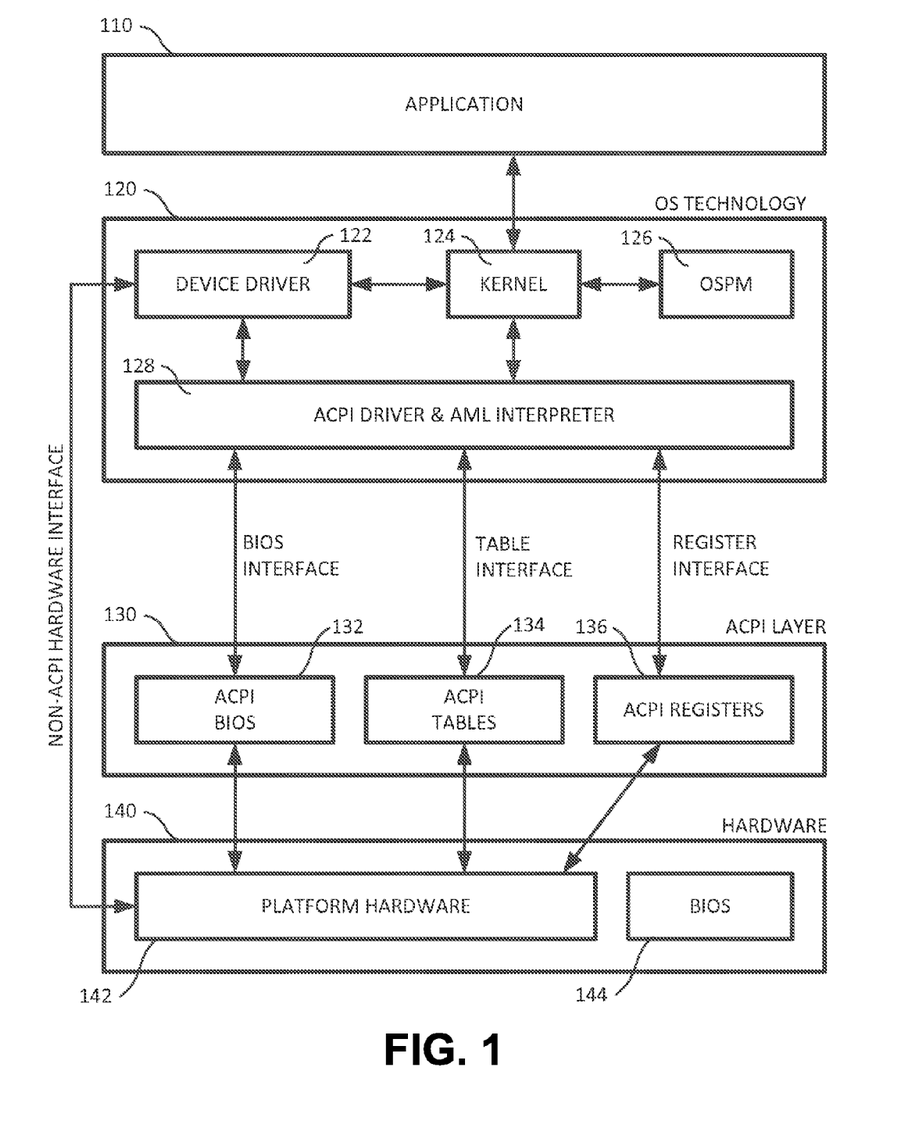
FIG. 1 shows a block diagram of an Advanced Configuration Power Interface (ACPI) aware system that uses ACPI according to one embodiment of the present disclosure.

The ACPI standard has been adopted by most PC manufacturers. FIG. 1 shows the main components of an ACPI-aware system 100 that uses ACPI. The ACPI-aware system 100 includes: (a) one or more applications 110, (c) an operating system 120, (c) an ACPI layer 130, and hardware 140. At the lowest level, the ACPI-aware system 100 has the platform hardware. The hardware 140 includes the platform hardware 142, and its BIOS 144. The ACPI layer includes: (a) a set of ACPI tables 134 that describe the hardware platform, (b) an ACPI BIOS API 132 for low-level management operations, and (c) a pre-defined set of ACPI registers 136. In the upper level, the operating system contains: (a) an ACPI Driver and an ACPI Machine Language (AML) Interpreter 128, (b) a device driver 122, (c) a kernel 124, and (d) an operating system-directed power management (OSPM) module 126. The ACPI Driver and AML Interpreter 128 communicates downwards with: (a) the ACPI BIOS 132 through a BIOS interface, (b) the ACPI tables 134 thorough a table interface, and (c) the ACPI registers through a register interfaces. Internally, the ACPI Driver and AML Interpreter 128 interacts with the device driver 122 and the kernel 124 of the operating system 120. In addition to going through the ACPI layer 130, the device driver 122 of the operating system 120 may also communicates with the platform hardware 142 through a non-ACPI hardware interface.

The ACPI Specification defines three types of components:

ACPI Tables:
  The ACPI tables 134 are the central data structure of an ACPI-based system. They contain definition blocks that describe all the hardware that can be managed through ACPI. These definition blocks include both data and machine-independent byte-code that is used to perform hardware management operations. Following exemplary tables are defined by the ACPI to provide the interface between an ACPI-compliant operating system, and system firmware:
    DSDT—Differentiated System Description Table;
    SSDT—Secondary System Description Table;
    SRAT—System Resource Affinity Table
  The tables allow description of system hardware in a platform-independent manner, and are presented as either fixed-formatted data structures or in AML. The main AML table is the DSDT (differentiated system description table).
  The Root System Description Pointer is located in a platform-dependent manner, and describes the rest of the tables.

ACPI BIOS:
  The ACPI BIOS 132 is a small BIOS that performs basic low-level management operations on the hardware. These operations include code to help boot the system and to put the system to sleep or wake it up. The ACPI BIOS 132 is much smaller than an APM BIOS because most of the management functions have moved into the operating system and ACPI tables.

ACPI Registers:
  The ACPI registers 136 are a set of hardware management registers defined by the ACPI specification. The address of these registers is located through definition blocks in the ACPI tables 134. The hardware designers may provide additional management registers beyond the ones defined in the ACPI specification. These additional registers can be located and accessed through the byte-code stored in the device-specific part of the ACPI tables. Following is a list of ACPI registers defined in the ACPI specification:
    PM1 Event Registers;
    PM1 Control Registers;
    PM2 Control Register;
    PM Timer Register;
    Processor Control Block (P_BLK); and
    General-Purpose Event Registers When an ACPI-based system is powered up, the operating system is loaded the ACPI BIOS 132 places the initial ACPI tables 134 in memory. Since the ACPI tables 134 are typically too large to put in the 128 KB BIOS memory area, the ACPI BIOS 132 obtains a physical memory map of the system in order to allocate space for the ACPI tables. When an ACPI-aware operating system kernel is started, it searches for a small data structure within the BIOS memory area. If a valid structure is found (e.g. if its checksum and signature match) then the kernel uses this structure to obtain a pointer to the ACPI tables and memory map. This information is used by the kernel to preserve the ACPI tables when the virtual memory system is started.

Except for the few operations performed by the ACPI BIOS, almost all ACPI operations are performed in the operating system context by interpreting machine-independent ACPI Machine Language (AML) byte-code stored in the ACPI tables. These blocks of AML are called methods. AML methods are stored in specially named nodes in the ACPI namespace.

AML is usually compiled from human-readable ACPI Source Language (ASL). An ACPI-aware operating system must include code that accesses the ACPI BIOS 132, ACPI tables 134, and ACPI registers 136. It must also include an AML byte-code interpreter. This upper layer of core ACPI software is shown in FIG. 1.

Hardware power management events trigger an OS-visible interrupt called a "system control interrupt" (SCI). Operating systems handle simple SCI interrupts (e.g. fixed-feature power button state change) directly. Complex SCI interrupts are handled by the OS using AML code associated with the interrupt.

The ACPI specification defines Global states, Sleep states, Device states, Processor states, and performance states.

Global states: four Global "Gx" states and six Sleep "Sx" states are defined in ACPI specification for an ACPI-compliant computer-system. They are:
  G0 (S0): Working. "Awaymode" is a subset of S0, where monitor is off but background tasks are running
  G1, Sleeping subdivides into the four states S1 through S4:
    S1: All processor caches are flushed, and the CPU(s) stops executing instructions. Power to the CPU(s) and RAM is maintained; devices that do not indicate they must remain on may be powered down.
    S2: CPU powered off. Dirty cache is flushed to RAM.

S3: Commonly referred to as Standby, Sleep, or Suspend to RAM (STR) RAM remains powered.

S4: Hibernation_or Suspend to Disk. All content of main memory is saved to non-volatile memory such as a hard drive, and is powered down.

G2 (S5), Soft Off G2/S5 is almost the same as G3 Mechanical Off, except that the PSU still supplies power, at a minimum, to the power button to allow return to S0. A full reboot is required. No previous content is retained. Other components may remain powered so the computer can "wake" on input from the keyboard, clock, modem, LAN, or USB device.

G3, Mechanical Off: The computer's power has been totally removed via a mechanical switch (as on the rear of a PSU). The power cord can be removed and the system is safe for disassembly (typically, only the real-time clock continues to run—using its own small battery).

Furthermore, the specification defines a Legacy state: the state on an operating system which does not support ACPI. In this state, the hardware and power are not managed via ACPI, effectively disabling ACPI.

Device states: The device states D0-D3 are device-dependent:
D0 Fully On is the operating state.
D1 and D2 are intermediate power-states whose definition varies by device.
D3 Off has the device powered off and unresponsive to its bus.
D3 Hot & Cold, The D3 state is further divided into D3 Hot (has Aux power) and D3 Cold (no power provided). A device in D3 Hot can assert power management requests to transition to higher power states.

Processor states: The CPU power states C0-C3 are defined as follows:
C0 is the operating state.
C1 (often known as Halt) is a state where the processor is not executing instructions, but can return to an executing state essentially instantaneously. All ACPI-conformant processors must support this power state. Some processors, also support an Enhanced C1 state (C1E or Enhanced Halt State) for lower power consumption.
C2 (often known as Stop-Clock) is a state where the processor maintains all software-visible state, but may take longer to wake up. This processor state is optional.
C3 (often known as Sleep) is a state where the processor does not need to keep its cache coherent, but maintains other state. Some processors have variations on the C3 state (Deep Sleep, Deeper Sleep, etc.) that differ in how long it takes to wake the processor. This processor state is optional.

Performance states: While a device or processor operates (D0 and C0, respectively), it can be in one of several power-performance states. These states are implementation-dependent. Though, P0 is always the highest-performance state; with P1 to Pn being successively lower-performance states, up to an implementation-specific limit of n no greater than 16. P-states have become known as SpeedStep in Intel processors, as PowerNow! or Cool'n'Quiet in AMD processors, and as PowerSaver in VIA processors.
P0 max power and frequency
P1 less than P0, voltage/frequency scaled
P2 less than P1, voltage/frequency scaled
. . .
Pn less than P(n−1), voltage/frequency scaled It is known to those skilled in the art that the dynamic power dissipated by a processor is $P=C*V^2*F$, where P is power, C is the capacitance being switched per clock cycle, V is the CPU voltage, and F is the processor frequency (cycles per second). Increases in frequency thus increase the amount of power used in a processor. For example, an Athlon A64 X2 4800+ CPU, the P-states, the clock ratio, the clock, the CPU voltage and CPU load are listed in the following Table 1:

| Athlon A64 X2 4800+ CPU | | | | |
|---|---|---|---|---|
| P-States | Clock Ratio | CPU Clock | CPU Voltage | CPU Load |
| P0 | 12x | 2.40 GHZ | 1.350 V | 81-100% |
| P1 | 11x | 2.20 GHZ | 1.350 V | 61-80% |
| P2 | 10x | 2.00 GHZ | 1.325 V | 51-60% |
| P3 | 9x | 1.80 GHZ | 1.300 V | 41-50% |
| P4 | 8x | 1.60 GHZ | 1.250 V | 31-40% |
| P5 | 7x | 1.40 GHZ | 1.200 V | 21-30% |
| P6 | 6x | 1.20 GHZ | 1.150 V | 11-20% |
| P7 | 5x | 1.00 GHZ | 1.100 V | 0-10% |

The Table 1 indicates that the CPU clock rate must maintain at least a minimum CPU clock rate, and not exceed a maximum CPU clock rate. Additionally, the CPU clock rate increase or decrease is not continuous, but rather in discrete steps. The discrete step between one allowable clock rate and the next allowable clock rate is its base frequency of 200 MHz. In the example of Athlon A64 X2 4800+CPU, the minimum CPU clock rate is at least 1.00 GHz (5×200 MHz), and the maximum CPU clock rate is 2.40 Ghz (11×200 MHz). Similarly, the CPU voltage also must maintain a suitable working voltage range having a minimum CPU voltage and a maximum CPU voltage. In the example of Athlon A64 X2 4800+CPU, the minimum CPU voltage is at least 1.100V, and the maximum CPU voltage is 1.350V. Although the CPU voltage can be adjust continuously, discrete steps are carefully chosen to achieve the required CPU load level based on sufficient experiments.

The Table 1 shows that there are two power conservation techniques:

(a) dynamic frequency scaling: the frequency of a CPU can be adjusted "on the fly." As frequency changes, the dynamic power will change linearly with it. The purpose of using this technique is either to conserve power or to reduce the amount of heat generated by the chip, and (b) dynamic voltage scaling: the voltage used on a CPU is increased or decreased, depending upon circumstances. Dynamic voltage scaling to increase voltage is known as overvolting; dynamic voltage scaling to decrease voltage is known as undervolting. Undervolting is done in order to conserve power, particularly in laptops and other mobile devices, where energy comes from a battery and thus is limited. Overvolting is done in order to increase computer performance, or in rare cases, to increase reliability.

The dynamic frequency scaling technique and the dynamic voltage scaling can be combined to further reduce the power consumption. Different processor stepping may implement a different set of clock ratio/voltage lookup table. The clock ratio/voltage tables shown above are just examples to describe the differences in P-states used in different CPU models, even of the same family.

The CPU load incorporated with various P-states is one of the ways to utilize the P-state power management. Power management for a desktop computer, or a laptop computer is important because it saves the energy consumed by the computer, reduce the heat generated by the CPU. It is especially important for the laptop computer because it extends the time of computer use for each full charge, and also extends the life of the computer battery. If we can limit the CPU load of a computer, then we can limit the power consumption of the computer, and if we can adjust the clock rate down, and/or reduce the CPU voltage, then we can limit the CPU load. Therefore, we can limit the CPU load to conserve energy by reducing the clock rate and/or the CPU voltage.

On the other hand, in an office environment, every computer user uses a computer differently. For example, for a technical writer, his/her daily work mostly involves technical writing and editing, and does not require a lot of computer resources. In this case, his/her demand for computer CPU load may be only 10-15% of that a modern computer can offer. For a system developer, a software engineer, or a scientist, his/her line of work requires a lot of computing power and various resources. In this case, his/her demand for computer CPU load may be only 80-100% of that a modern computer can offer. Therefore, it is desirable to design a computer energy saving method that can minimize the energy consumption based on user category, the user's demand for computer resource, and user's computer usage pattern, such that energy conservation method does not hamper the computer user's ability to perform his/her daily function.

Figure 2:
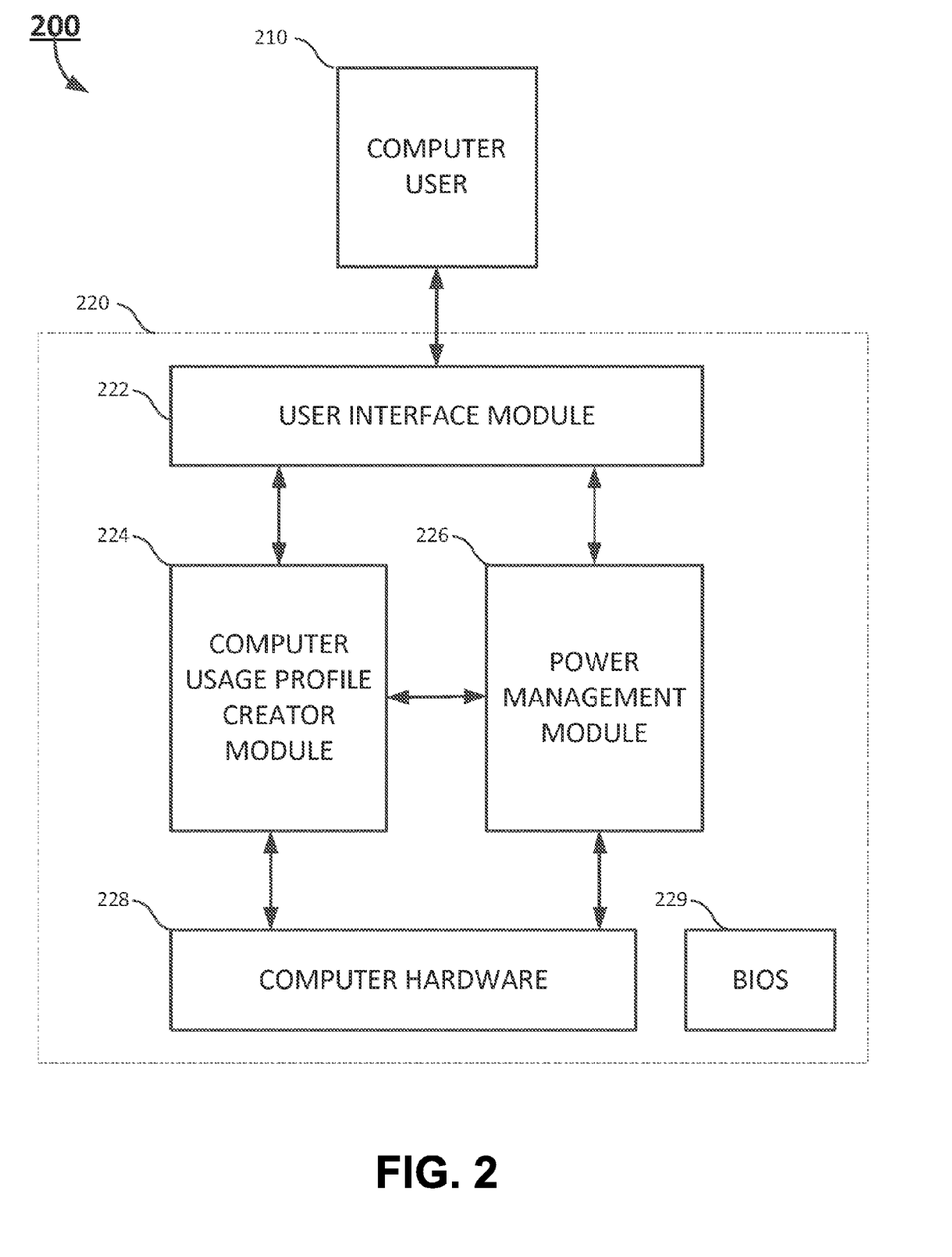
FIG. 2 shows a block diagram of a predicative power management system that adjusts the computer performance to conserve energy based on user category, user demand for computer resource, and user's computer usage pattern according to one embodiment of the present disclosure.

FIG. 2 shows a block diagram of a predicative power management system 220 that adjust the computer performance to conserve energy based on user category, user demand for computer resource, and user's computer usage pattern according to one embodiment of the present disclosure. In certain embodiments, the predicative power management system 220 includes: (a) a user interface module 222 configured to interact with a computer user 210, (b) a computer usage profile creator module 224, (c) a power management module 226, (d) computer hardware 228, and (e) a computer BIOS 229. The principle of the predicative power management system 220 is (a) using a computer program installed on a computer to create one computer usage profile based on observing the computer usage and demand for computing resources of each of computer users over a pre-determined period time to determine the computer usage profile for each of the computer users, (b) each of the computer usage profiles is stored in the power management module 226 for every computer user who uses the computer, (c) when one of the computer users logs into the computer, the power management module 226 automatically retrieve the computer usage profile associated with the computer user and use the computer usage profile to adjust the computer CPU clock, as well as the CPU voltage to minimize the energy consumption, and to provide sufficient computer resource to the computer user to perform his/her daily function, and (d) when necessary, the computer user can observe the current computer resource allocation, and adjust the computer CPU clock, and CPU voltage, or select a different computer usage profile to obtain necessary computer resource manually.

In certain embodiments, the user interface module 222 is configured to: (a) allow a computer user having a computer userID to log into the computer system with predicative power management system, (b) request the computer usage profile creator module 224 to monitor the computer user's daily computer usage pattern, and analyze the computer usage pattern and statistics for the computer user, (c) request the computer usage profile creator module 224 to create a computer user profile for the computer user and associate the computer usage profile with the computer user after observing over a pre-determined period of time, and (d) request the computer usage profile creator module 224 to store the computer usage profile in the power management module 226, (e) apply the computer usage profile associated with the computer user upon the computer user logs into the computer system, and (f) allow the computer user to manually change the CPU load when necessary.

In certain embodiments, allowing the computer user to manually change the CPU load includes: (a) displaying the current userID, and the current computer usage profile settings, (b) allowing the computer user to manually using hotkey combinations to adjust the CPU clock rate, (c) allowing the computer user to manually using hotkey combinations to adjust the CPU voltage, or (d) a combination of (b) and (c).

The computer usage profile creator module 224 is configured to: (a) receive instructions from the user interface module 222 to monitor the computer user's daily computer usage pattern, (b) access the hardware of the computer to monitor the computer resource, especially the CPU loads, (c) analyze the computer usage pattern and statistics for the computer user including the daily maximum CPU load, the daily minimum CPU load, the average daily CPU load, (d) create a computer usage profile for the computer user to set a upper limit of the CPU load based on the computer usage pattern and statistics for the computer user, and (e) store the created computer usage profile in the power management module 226. Additionally, the computer usage profile creator module 224 is also configured to: (f) import computer usage profile from external computer usage profile source, and (g) allow the computer user to create, edit, and manipulate the computer usage profiles stored in the power management module 226. The computer usage profile includes information related to the upper limit of CPU load such that energy conservation is maximized while sufficient computer resource is provided to the computer user to guarantee his/her ability to perform his/her daily function. The association of computer users and their default computer usage profiles are stored in a user and default profile table as shown in FIG. 3A.

The user and default profile table includes N computer users, where N is a positive integer, M different computer usage profiles, where M is another positive integer, and user profile descriptions. For example, the USER-1 is an administrator assistant, and USER-N is a technical writer. The jobs the USER-1 and USER-N involved daily are not more than emailing, editing documents, and running errands. Based on the observation over a period of a month, their maximum CPU load is between 10-30% of the maximum CPU load of a computer having a CORE 2 EXTREME X6800 CPU as shown in a CORE 2 EXTREME X6800 Profile Table in FIG. 3B. Therefore, their default computer usage profile is set as PROFILE-4. When the USER-1 or the USER-N logs into the computer system, and the power management module 226 will automatically set the computer hardware to use the CPU clock at 1.87 GHz, and the CPU voltage at 1.2000V such that the computer provides sufficient CPU load to the USER-1 or the USER-N to perform his/her daily function and maximizes the energy conservation. On the other hand, the USER-2 is a System Engineer, or a test/verification engineer. The USER-2 may require much more computer CPU load than the technical writer or administrative assistant. An exemplary CPU load for these types of computer users may be 81-100%. Therefore, their default computer usage profile is set as PROFILE-4. When the USER-2 logs into the computer system, and the power management module 226 will automatically set the computer hardware to use the CPU clock at 2.93 GHz, and the CPU voltage at 1.2875V such that the computer provides sufficient CPU load to the USER-2 to perform his/her daily function and maximizes the energy conservation.

It is important to note that each different CPU has its own profile table, even for the CPU from same family, their clock ratio, clock rate, CPU voltage and CPU loads are likely different. Therefore, the Profile Table and number of different profiles have to be created for each different type of CPU. In the example of FIG. 3B, there are only 6 different computer usage profiles Profile-N, where N=0, 1, 2, 3, 4, and 5.

Figure 3A:
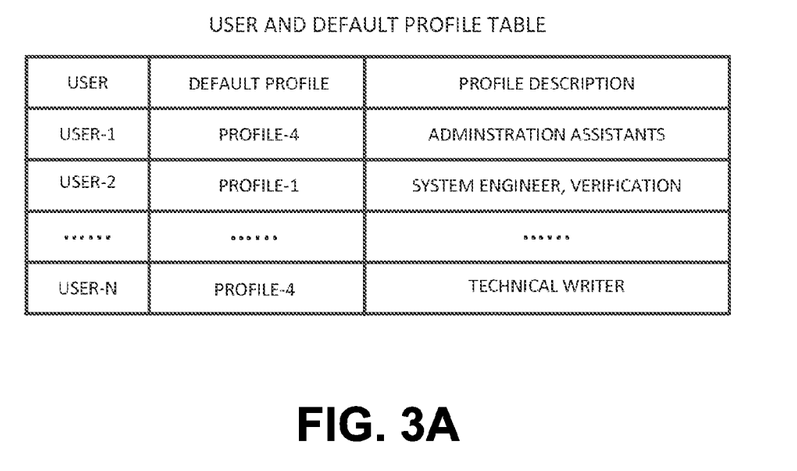
FIGS. 3A and 3B show a table of various users and their default profiles and an exemplary profile table used by the predicative power management system respectively according to one embodiment of the present disclosure.
Figure 3B:
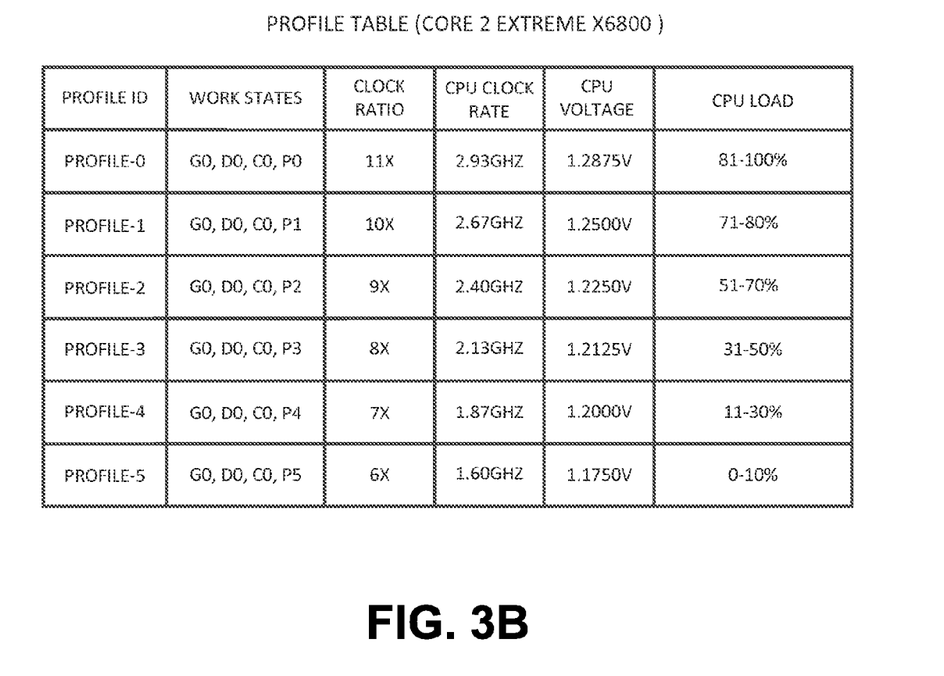

The user and default profile table as shown in FIG. 3A and Profile Table as shown in FIG. 3B are stored in the power management module 226. The power management module 226 is configured to: (a) receive the user and default profile table from the computer usage profile creator module 224, (b) store the user and default profile table received, (c) receive the profile table from the computer usage profile creator module 224, (d) store the profile table received, (e) set the computer CPU load level according to the default computer usage profile for the computer user currently logged in, (f) display the current CPU load, current CPU clock rate, current CPU voltage, and current computer usage profile settings; (g) allow the computer user to select a computer usage profile stored in the profile table that is different from its default computer usage profile, (h) allow the computer user to increase or decrease the CPU clock rate manually, and (i) allow the computer user to increase or decrease the CPU voltage manually.

In certain embodiments, the computer user can increase the CPU clock rate manually by using a hotkey combination such as <CTRL>+<ALT>+<+>, and decrease the CPU clock rate manually by using a hotkey combination such as <CTRL>+<ALT>+<−>. The computer user can increase the CPU voltage manually by using a hotkey combination such as <CTRL>+<ALT>+<↑>, and decrease the CPU voltage manually by using a hotkey combination such as <CTRL>+<ALT>+<↓>.

In addition to adjusting CPU clock rate, and adjusting CPU voltage to conserve energy, there are also many other components in an ACPI-compliant computer system that can be turned off, put to sleep, or put into hibernation state to further conserve energy consumption. These components include: (a) Bluetooth Radios, (b) one or more disk drives, (c) display adapters, (d) multimedia devices such as camera and microphone, (e) Wi-Fi adapter, (f) Sound/Video/Gaming controllers, (g) PCI bus, (h) communication ports, and (i) DVD/CD drivers. The computer usage profile creator module 224 can also incorporate the respective device states for each of the devices into the computer usage profile for each of the computer users. When a computer user logs into a computer system, the computer operating system and the power management system module automatically sets the appropriate CPU clock rate, the CPU voltage, and all devices states for each of the devices installed, to maximizing the energy saving based on the computer user category, the computer usage patterns, and different computer usage profiles.

Computer operating system is further enhanced to support ACPI-defined features, concepts, and interfaces discussed above, along with their associated event models appropriate to the system platform class upon which the OS executes. This is the implementation of OSPM. The following outlines the OS enhancements and elements necessary to support all ACPI-defined interfaces. To support ACPI through the implementation of OSPM, the OS needs to be modified to:

Use system address map reporting interfaces.
    Find and consume the ACPI System Description Tables.
    Interpret ACPI machine language (AML).
    Enumerate and configure motherboard devices described in the ACPI Namespace.
    Interface with the power management timer.
    Interface with the real-time clock wake alarm.
    Enter ACPI mode (on legacy hardware systems).
    Implement device power management policy.
    Implement power resource management.
    Implement processor power states in the scheduler idle handlers.
    Control processor and device performance states.
    Implement the ACPI thermal model.
    Support the ACPI Event programming model including handling SCI interrupts, managing fixed events, general-purpose events, embedded controller interrupts, and dynamic device support.
    Support acquisition and release of the Global Lock.
    Use the reset register to reset the system.
    Provide APIs to influence power management policy.
    Implement driver support for ACPI-defined devices.
    Implement APIs supporting the system indicators.
    Support all system states S1-S5.

With the operating system enhancements above, the operating system can maximize the energy saving by directly accessing the ACPI tables, ACPI registers through the ACPI BIOS to set or adjust the CPU clock rate, set or adjust the CPU voltage to implement the computer usage profile selected, and change (increase/decrease) the setting manually if necessary.

Figure 4:
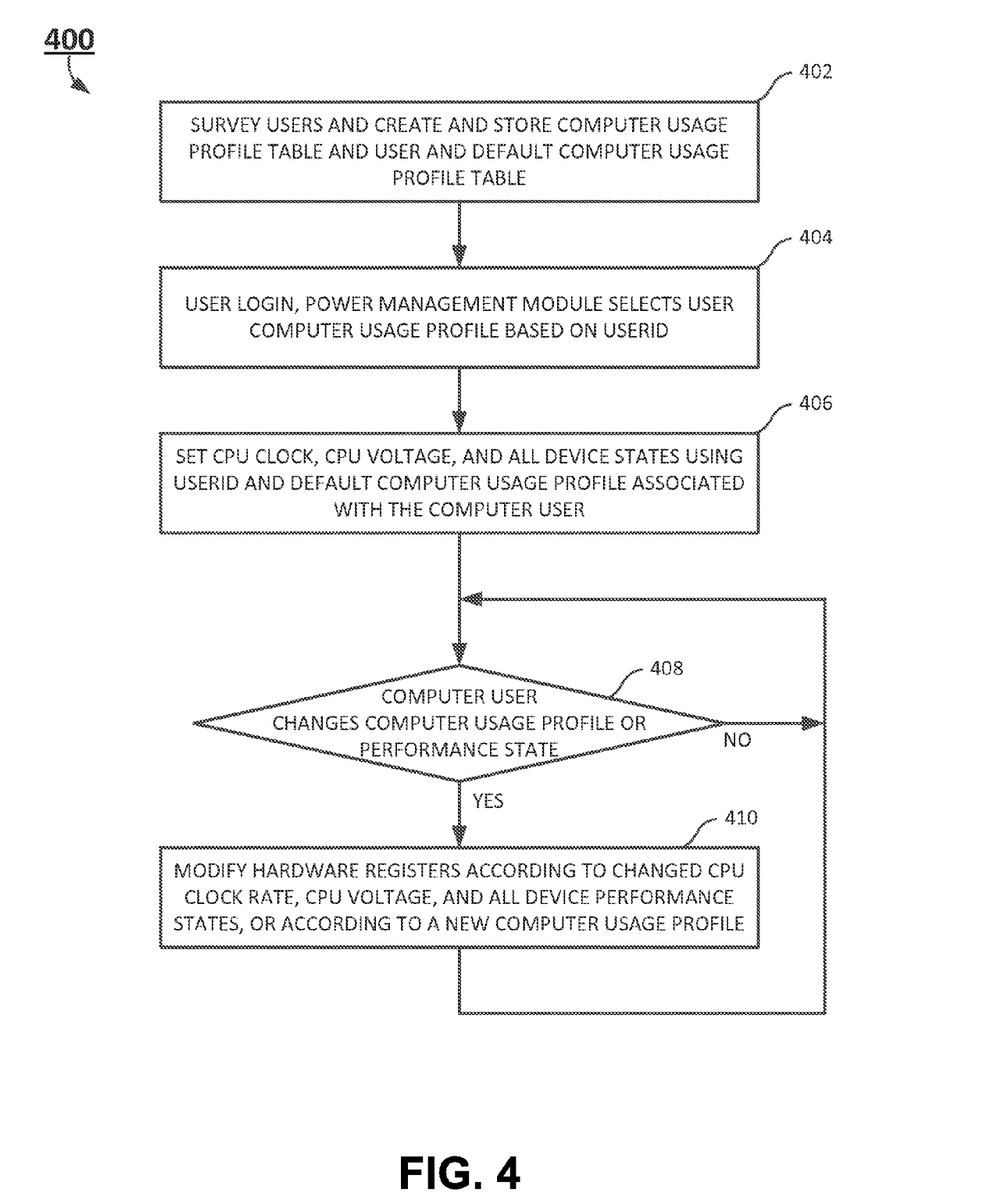
FIG. 4 shows a flow chart of operations of an exemplary predicative power management system according to one embodiment of the present disclosure.

FIG. 4 shows a flow chart 400 of exemplary operations of a predicative power management system predicatively manage power consumption on a computer based on the use category according to certain embodiments of the present disclosure.

At operation 402: at the start, a computer user 210 having a userID logs into a computer system with a predicative power management system 220 through a user interface module 222. The computer user 210 uses a computer usage profile creator module 224 to monitor the computer usage, demand for computer resource, and his/her computer usage pattern of the computer user 210. The computer usage profile creator module 224 accesses the computer hardware 228, monitors the computer usage by the computer user 210, and records computer usage patterns and computer usage statistics such as the minimum CPU load, maximum CPU load, daily average CPU load etc., and the device states of all computer device and components installed on the computer system. The computer usage profile creator module 224 then analyses the information collected over a pre-determined period time for each computer user, and summarize the computer usage into many different computer usage profiles and each of these computer usage profiles is defined by a unique profileID. The userID is stored in the user and default profile table as shown in FIG. 3A, and the computer usage profiles are stored in the Profile Table as shown in FIG. 3B. The computer usage profile creator module 224 also includes the ability to import computer usage profiles from other computer usage profile sources, and ability to edit and modify computer usage profiles.

At operation 404: the computer user 210 logs into the computer system with a predicative power management system 220 through a user interface module 222. The power management module uses the userID information at the login, looks for a default computer usage profile in the User and Default Computer Usage Profile Table, and direct accesses the computer hardware registers to set up the computer usage profile according to the user category and the default computer usage profile. The computer user 210 can also select a computer usage profile that is different from the default computer usage profile listed in the user and default computer usage profile table.

At operation 406: the power management module 226 sets up the appropriate CPU clock rate and CPU voltage, as well as all device states for all devices/components installed on the computer system according to the default or selected computer usage profile. The computer is operated according to the computer usage profile to achieve maximum energy saving and provide sufficient computer resources allow the computer user to perform his/her daily function.

At operation 408: if there is a need to change the current computer usage patterns, such as demanding higher CPU clock rate, higher CPU voltage to boost the CPU load, or change the device state of certain devices in the computer system, the process go to the next operation 410. If no change is needed, the process goes back to operation 408.

At operation 410: the computer user 210 wishes to make change to the current CPU clock rate, CPU voltage, or other device states for the devices installed on the computer system, the computer user 210 can (a) use the user interface module to display the current CPU clock rate, current CPU voltage, all related device states and the current computer usage profile settings, (b) manually select another computer usage profile to set the hardware registers according to the changed computer usage profile, and (c) individually change the CPU clock rate, CPU voltage, or both, by pressing certain hotkey combinations. For example: the computer user can increase the CPU clock rate manually by using a hotkey combination such as <CTRL>+<ALT>+<+>, and decrease the CPU clock rate manually by using a hotkey combination such as <CTRL>+<ALT>+<−>. The computer user can increase the CPU voltage manually by using a hotkey combination such as <CTRL>+<ALT>+<↑>, and decrease the CPU voltage manually by using a hotkey combination such as <CTRL>+<ALT>+<↓>. Such increases or decreases are usually in a discrete step, not a continuous increase to decrease. For example, for CORE 2 EXTREME X6800 CPU, the discrete step is at least one base frequency 266.67 MHz, and the discrete steps are 1.60 GHz, 1.87 Ghz, 2.13 GHz, 2.40 GHz, 2.67 GHz, and 2.93 GHz. Each of these steps is an allowable CPU clock rate. CPU clock rates other than those listed here are not permissible for this CPU. The CPU voltage are also carefully chosen to achieve certain predetermined CPU load level in conjunction with the CPU clock rate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A predicative computer power management method based on user category comprising:
    creating a plurality of computer usage profiles for a plurality of computer users, based on their daily computer usages in a computer, wherein each of the plurality of computer users has a unique userID, and each of the plurality of computer usage profiles has a unique profileID;
    storing the plurality of computer usage profiles and the plurality of computer userIDs in a power management module;
    associating each of the plurality of computer users with at least one computer usage profile; and
    adjusting the CPU clock rate, CPU voltage, and device states to conserve energy based on a computer user and its associated computer usage profile when the computer user logs into the computer.

2. The method of claim 1, wherein the creating action comprises:
    monitoring the CPU usage by a computer user profile creator module for each of the plurality of computer users over a predetermined time to obtain the history of the daily usages of computer resource by the plurality of computer users;
    analyzing the obtained history of the daily usages of the computer resource by the plurality of computer users;
    determining the maximum, minimum, and average daily usage of the computer resource by the plurality of computer users; and
    setting optimal CPU clock rate, CPU voltage and device states needed by the each of the plurality of computer users in a computer usage profile associated with a computer user such that the computer user's daily function will not be affected by using the optimal CPU clock rate, CPU voltage and device states to achieve maximum energy saving.

3. The method of claim 2, wherein the computer user profile creator module has access to the CPU to monitor the CPU usage statistics.

4. The method of claim 1, wherein the plurality of computer users is categorized into a plurality of user categories, wherein the computer users belonging to each user category perform similar functions, have similar demands for the computer resources and similar computer usage patterns.

5. The method of claim 1, wherein the adjusting the CPU clock rate action comprises:
    setting the CPU clock rate at the computer user login based on a default CPU clock rate set by the default computer usage profile;
    setting the CPU voltage at the computer user login based on a default CPU voltage set by the default computer usage profile;
    setting the device states for the devices at the computer user login based on a default device states set by the default computer usage profile;
    setting the CPU clock rate according to the default CPU clock rate set by a computer usage profile selected by the computer user that is different from the default computer usage profile;
    setting the CPU voltage according to the default CPU voltage set by a computer usage profile selected by the computer user that is different from the default computer usage profile;
    setting the device states for the devices according to the default device states set by a computer usage profile selected by the computer user that is different from the default computer usage profile;
    changing the CPU clock rate manually by the computer user pressing certain hotkey combinations to increase or decrease the CPU clock rate of the computer by a discrete step up or down;
    changing the CPU voltage manually by the computer user pressing certain hotkey combinations to increase or decrease the CPU voltage of the computer by a discrete step up or down; and
    changing the device states manually by the computer user.

6. The method of claim 5, wherein the setting the CPU clock rate action comprises displaying the current CPU clock rate on a screen for the computer user, the setting CPU voltage action comprises displaying the current CPU voltage on a screen for the computer user, and setting device states action comprises displaying the current device states on a screen for the computer user.

7. The method of claim 5, wherein the pressing certain hotkeys comprise:
pressing a first keystroke combination simultaneously for increasing the CPU clock rate by a discrete step up;
pressing a second keystroke combination simultaneously for decreasing the CPU clock rate by a discrete step down;
pressing a third keystroke combination simultaneously for increasing the CPU voltage by a discrete step up; and
pressing a fourth keystroke combination simultaneously for decreasing the CPU voltage by a discrete step down.

8. The method of claim 7, wherein one discrete CPU clock rate step is the CPU clock rate difference between a first allowable CPU clock rate and the next higher allowable CPU clock rate, and wherein one discrete CPU voltage step is the CPU voltage difference between a first allowable CPU voltage and the next higher allowable CPU voltage.

9. The method of claim 8, wherein each of allowable CPU clock rates is a CPU clock rate between a minimum allowable CPU clock rate and a maximum allowable CPU clock rate, and wherein each of allowable CPU voltages is a CPU voltage between a minimum allowable CPU voltage and a maximum allowable CPU voltage.

10. A predicative power management system configured to adjust computer CPU clock rate by a computer user to conserve energy based on user category comprising:
a computer user profile creator module configured to create a computer usage profile having a profileID for a computer user with a computer userID; and
a power management module configured to set and adjust computer CPU clock rate, CPU voltage and device states based on the computer user category and the computer user's computer usage profile.

11. The predicative power management system of claim 10, wherein the computer user profile creator module is configured to
monitor the CPU usage by the computer user profile creator module for each of the plurality of computer users over a predetermined time to obtain the history of the daily usages of computer resource by the plurality of computer users;
analyze the obtained history of the daily usages of the computer resource by the plurality of computer users;
determine the maximum, minimum, and average daily usage of the computer resource by the plurality of computer users; and
set optimal CPU clock rate, CPU voltage and device states needed by the each of the plurality of computer users in a computer usage profile associated with a computer user such that the computer user's daily function will not be affected by using the optimal CPU clock rate, CPU voltage and device states to achieve maximum energy saving.

12. The predicative power management system of claim 11, wherein the computer user profile creator module is further configured to
import a plurality of computer usage profiles previously obtained from other computer systems;
edit or modify a plurality of computer usage profiles existed; and
assign a computer usage profile to a computer user.

13. The predicative power management system of claim 10, wherein the power management module is configured to
receive the plurality of computer usage profiles for the plurality of computer users from the computer user profile creator module;
store the plurality of computer users and the plurality of computer usage profiles in a user and default computer usage profile table;
associate each of the plurality of computer users with one default computer usage profile for the computer user;
set the computer CPU clock rate, CPU voltage, and device states according to the default computer usage profile upon the computer user logs into the computer system; and
allow the computer user press certain hotkeys to adjust the CPU clock rate, CPU voltage, and device states when necessary.

14. The predicative power management system of claim 13, wherein the power management module is further configured to
allow a computer user to select a computer usage profile other than a default computer usage profile associated with the computer user;
display the current CPU clock rate;
display the current CPU voltage;
display the current device states; and
display the current computer usage profile settings.

15. The predicative power management system of claim 13, wherein the pressing certain hotkeys combination action comprises:
pressing a first keystroke combination simultaneously for increasing the CPU clock rate by a discrete step up;
pressing a second keystroke combination simultaneously for decreasing the CPU clock rate by a discrete step down;
pressing a third keystroke combination simultaneously for increasing the CPU voltage by a discrete step up; and
pressing a fourth keystroke combination simultaneously for decreasing the CPU voltage by a discrete step down.

16. The predicative power management system of claim 15, wherein one discrete CPU clock rate step is the CPU clock rate difference between a first allowable CPU clock rate and the next higher allowable CPU clock rate, and wherein one discrete CPU voltage step is the CPU voltage difference between a first allowable CPU voltage and the next higher allowable CPU voltage.

17. The predicative power management system of claim 16, wherein each of allowable CPU clock rates is a CPU clock rate between a minimum allowable CPU clock rate and a maximum allowable CPU clock rate, and wherein each of allowable CPU voltages is a CPU voltage between a minimum allowable CPU voltage and a maximum allowable CPU voltage.

18. A non-transitory computer storage medium having computer-executable instructions stored thereon which, when executed by a processor of a predicative computer power management system, cause the processor to:
create a plurality of computer usage profiles for a plurality of computer users, based on their daily computer usages in a computer, wherein each of the plurality of computer users has a unique userID, and each of the plurality of computer usage profiles has a unique profileID;
store the plurality of computer usage profiles and the plurality of computer userIDs in a power management module;
associate each of the plurality of computer users with at least one computer usage profile; and adjust the CPU clock rate, CPU voltage, and device states to conserve energy based on a computer user and its associated computer usage profile when the computer user logs into the computer.

19. The non-transitory computer storage medium of claim 18, further comprising the computer-executable instructions to:

monitor the CPU usage by the computer user profile creator module for each of the plurality of computer users over a predetermined time to obtain the history of the daily usages of computer resource by the plurality of computer users;

analyze the obtained history of the daily usages of the computer resource by the plurality of computer users;

determine the maximum, minimum, and average daily usage of the computer resource by the plurality of computer users; and set optimal CPU clock rate, CPU voltage and device states needed by the each of the plurality of computer users in a computer usage profile associated with a computer user such that the computer user's daily function will not be affected by using the optimal CPU clock rate, CPU voltage and device states to achieve maximum energy saving.

20. The non-transitory computer storage medium of claim 18, wherein the plurality of computer users is categorized into a plurality of user categories, wherein the computer users belonging to each user category perform similar functions, have similar demands for the computer resources and similar computer usage patterns.

* * * * *